Feb. 8, 1966   G. W. SOWER ETAL   3,234,457
NON-DESTRUCTIVE EDDY CURRENT TESTING DEVICE AND METHOD
UTILIZING SENSING MEANS MOVABLE RELATIVE TO THE
EXCITATION MEANS AND TEST PIECE

Filed Nov. 14, 1960   3 Sheets-Sheet 1

INVENTORS
GEORGE W. SOWER,
WILLIAM C. HARMON,
BY  RICHARD G. BAKER

WATTS, EDGERTON, PYLE & FISHER

B. D. Watts
ATTORNEYS

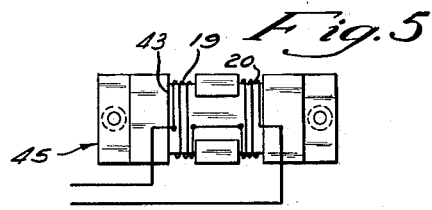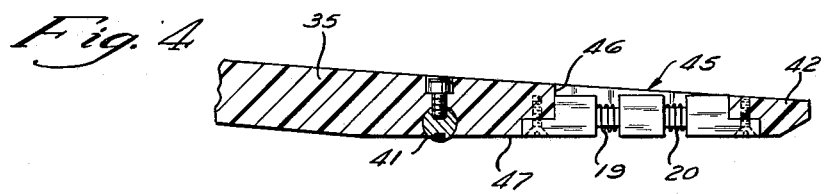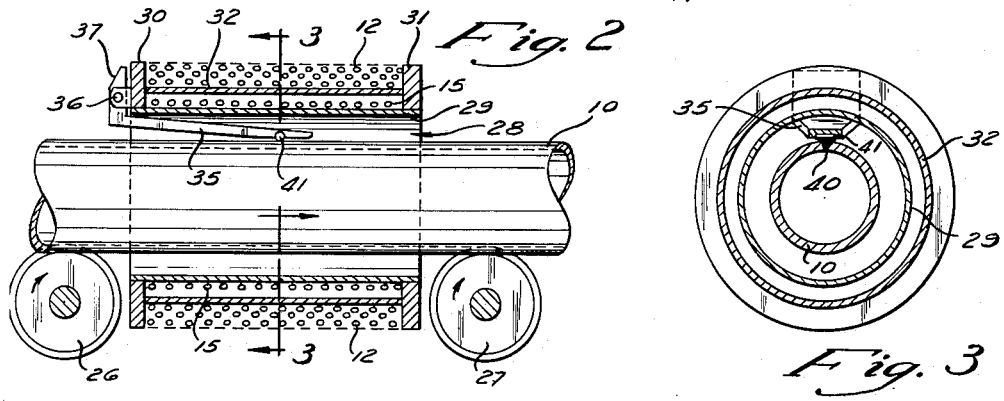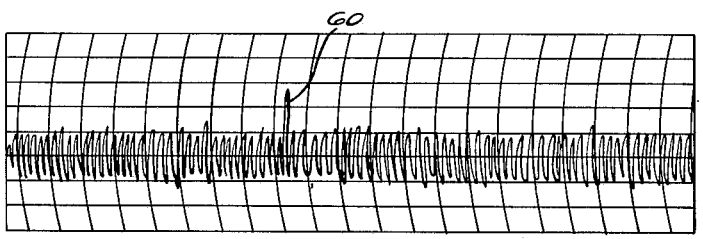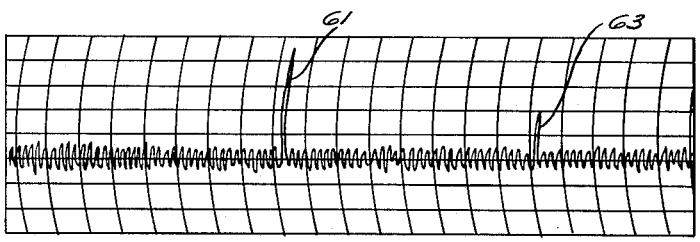

Feb. 8, 1966    G. W. SOWER ETAL    3,234,457
NON-DESTRUCTIVE EDDY CURRENT TESTING DEVICE AND METHOD
UTILIZING SENSING MEANS MOVABLE RELATIVE TO THE
EXCITATION MEANS AND TEST PIECE
Filed Nov. 14, 1960    3 Sheets-Sheet 3
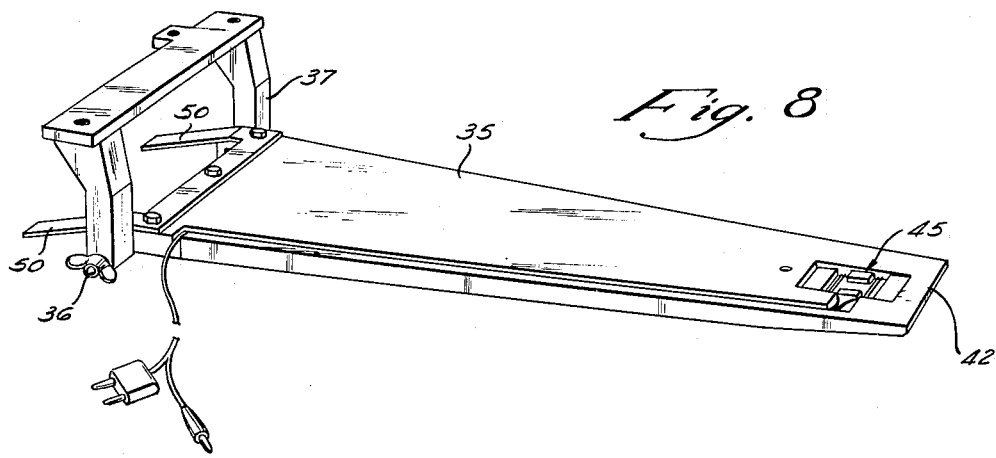
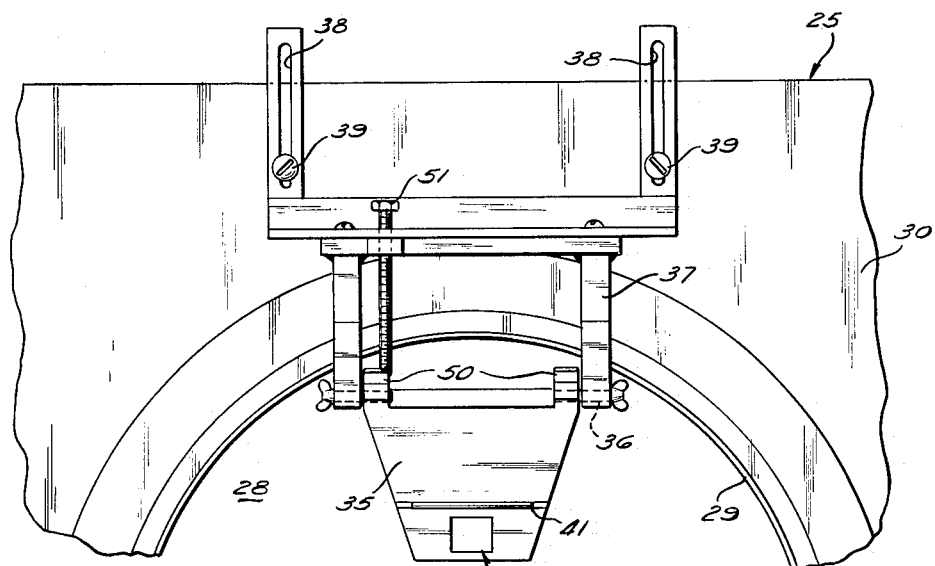
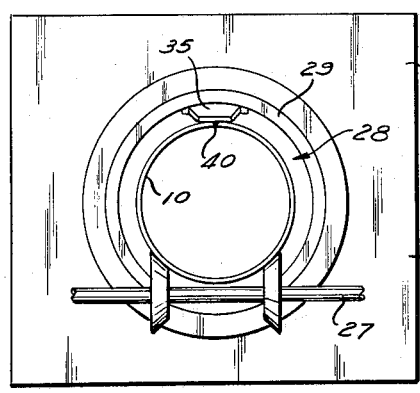
INVENTORS
GEORGE W. SOWER,
WILLIAM C. HARMON,
RICHARD G. BAKER
BY
WATTS, EDGERTON, PYLE & FISHER
ATTORNEYS

United States Patent Office 3,234,457
Patented Feb. 8, 1966

3,234,457
NON-DESTRUCTIVE EDDY CURRENT TESTING DEVICE AND METHOD UTILIZING SENSING MEANS MOVABLE RELATIVE TO THE EXCITATION MEANS AND TEST PIECE
George W. Sower, Cleveland Heights, William C. Harmon, Chagrin Falls, and Richard G. Baker, East Cleveland, Ohio, assignors to Republic Steel Corporation, Cleveland, Ohio, a corporation of New Jersey
Filed Nov. 14, 1960, Ser. No. 68,922
19 Claims. (Cl. 324—40)

This invention pertains to a method and apparatus for testing electrically conductive articles for defects, and more particularly to that class of flaw detection in which a flow of induced current affected by flaws in a work piece is measured to detect the presence of such flaws.

United States Patent No. 2,434,203 to Cecil Farrow entitled Method and Apparatus for Magnetic Testing teaches an apparatus in which energizing coils carry energizing current. The energizing current of one coil causes a flow of exciting electric current in an object being tested. Pick-up coils are provided which carry test electric current. The test current in each pick-up coil is induced by the magnet field of the exciting current flowing in the test object.

These pick-up coils are part of a Wheatstone bridge circuit which includes an indicating device. If the test current carried by the two pick-up coils is balanced, there will be no flow through the indicating device. If, on the other hand, there is a differential between the test currents in the two pick-up coils, then this will be reflected by the indicator.

When there is a flaw present in the test object, a distortion in the flow of exciting current through the test object will result. This distortion will cause a change in the test current in the test pick-up coil and therefore an unbalanced condition in the Wheatstone bridge circuit. This unbalanced condition can be detected and recorded by the indicating device.

The current in the energizing coils has been referred to as "energizing" current, current flowing in the test object and in the standard has been referred to as "exciting" current, and current in the secondary windings has been identified as "test" current. For clarity, this terminology will be followed throughout this description.

The present invention is directed to an improved flaw detection apparatus and method which utilizes the teachings of the preceding patent. With the invention of the previously discussed patent and the mechanism which has been made in accordance with those teachings, it has been assumed necessary to maintain the pick-up and energizing coils in fixed spaced relationship in order to avoid false signaling due to relative movement between the coils. Because of unavoidable irregularities in test pieces, such as crookedness, out of roundness, distorted ends and the like, it is necessary to provide a clearance space between the test piece and the energizing coil and the pick-up coil has been placed on the outside of the energizing coil for protection.

It has been found that the mentioned, fixed relationship between the energizing and pick-up coils is not essential. It has also been found that maintaining the pick-up coil in close proximity to the work piece and in constant space relationship with that portion of the work piece being tested is of extreme importance in producing improved test results.

One of the principal features of this invention is the obtainment of a constant space relationship between the portion of an object being tested and the pick-up coil. A related feature which leads to the realization of the first mentioned feature is a provision of a pick-up coil in a movable support which is urged into predetermined relationship with the portion of an object to be tested.

These features are, in the preferred arrangement, obtained through the provision of a pivotal arm which has a pick-up end which, when in its storage position, is in the path of travel of a work piece. A work piece, when transported past the induction coil and through the testing zone, comes into abutment with the pick-up arm urging the arm outwardly from its storage position. The arm includes a tracking means for following along the surface of an elongated test piece. The arm is biased into continuous abutment with the work piece, either by gravity or, if desired, through a suitable resilient biasing means.

With the method and apparatus of this invention, defects which have heretofore been undetectable are now readily discernible. A graphic recording means, responsive to test current flowing when an out-of-balance condition exists in the previously mentioned Wheatstone bridge circuit, will provide very clear, obvious, discernible indicia of the flaw whenever even the slightest defect is present in a pipe weld or other object under test.

The present invention will be better understood by those skilled in the art from the following specification taken in conjunction with the accompanying drawings in which:

FIGURE 2 is a sectional view of the novel and improved test mechanism as seen from an axial plane of cross section;

FIGURE 3 is a sectional view of the device as seen from the plane indicated by the line 3—3 of FIGURE 2;

FIGURE 4 is an enlarged sectional view of the outer end of the pick-up arm;

FIGURE 5 is a bottom plan view of the novel and improved pick-up coil of this invention;

FIGURE 6 is a graph of a typical test result obtained with a prior-art mechanism;

FIGURE 7 is a graph of typical test results with the present mechanism with the same test piece and over the same region as that utilized to obtain the graph of FIGURE 6;

FIGURE 8 is a perspective view of the novel and improved pick-up arm of this invention on an enlarged scale with respect to the preceding drawings;

FIGURE 9 is an elevational view of the improved pick-up arm mounted on a support bracket and showing a fragmentary end elevational view of a portion of the remainder of the test mechanism all on an enlarged scale with respect to the other drawings; and, FIGURE 10 is an end elevation view of the mechanism on the scale of FIGURES 2 and 3.

Figure 1:
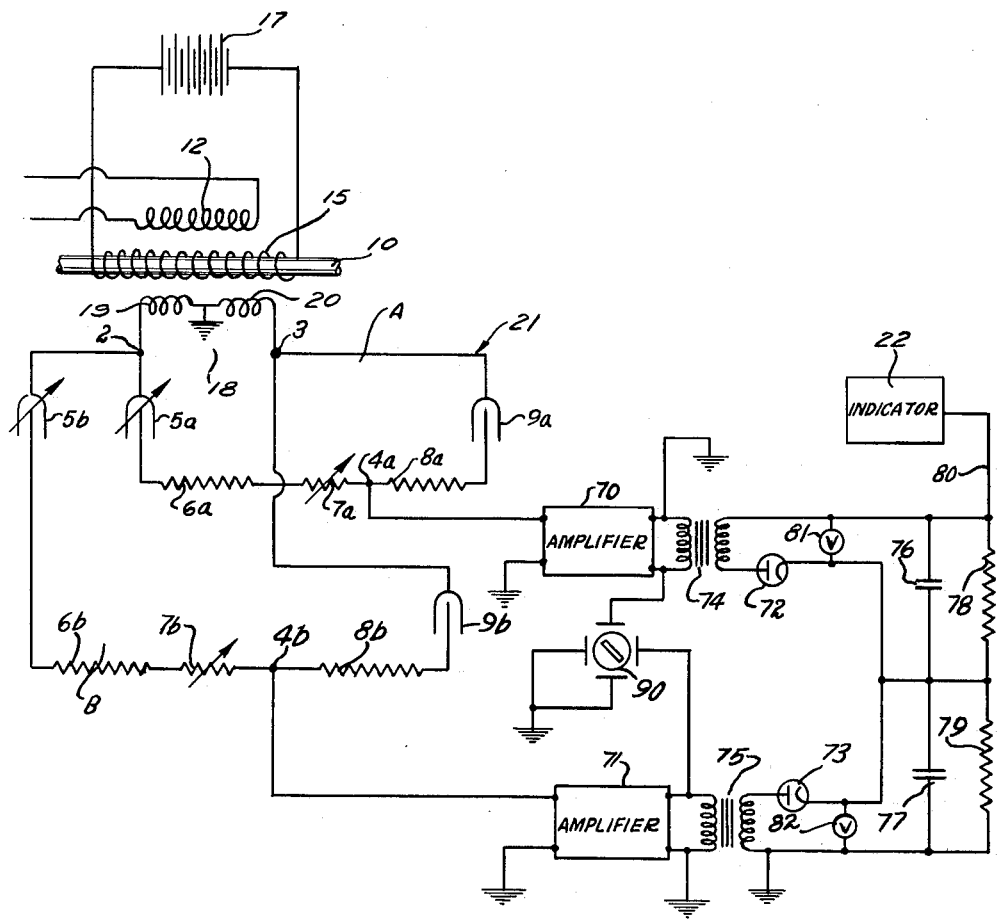
FIGURE 1 is a wiring diagram view of the test circuit.

With this mechanism a work piece 10 is provided. The work piece 10 is positioned within the induced magnetic field of an energizing coil 12. The energizing coil 12 is connected to a suitable source of electric energy (not shown).

If the work piece to be tested is capable of carrying an induced magnetism, a saturating magnetizing coil 15 is provided. This saturating magnetizing coil 15 is connected to a suitable source of electric energy such as battery 17. The coil 15 is provided to completely saturate the test work piece 10.

A pair of series connected pick-up coils 19, 20 are provided. The pick-up coils 19, 20 are grounded at 18 and are connected to an electronic bridge and indicator circuit designated generally by the reference character 21. The electronic circuit 21 corresponds essentially to the circuitry taught in the United States Patent 2,434,203 referenced above.

As is described in the Patent No. 2,434,203, two similar descrete circuits A and B are connected in parallel with each other and in series with the coils 19, 20 at 2, 3. Each circuit comprises variable condensers 5a or 5b, fixed resistances 6a or 6b, variable resistances 7a or 7b, fixed resistances 8a or 8b and fixed condensers 9a or 9b, the "a" series of elements being in connection in one circuit and the "b" series in the other, these of each circuit being connected in series in the order named and in series with the coils 19, 20. Each of the circuits is tapped at 4a and 4b respectively to form bridge circuits and are connected at their taps to separate amplifiers 70, 71 which are for amplifying the signals in the bridge circuits A and B respectively.

The output of the amplifier 70 is connected by the transformer 74 to the rectifier 72. The output of the amplifier 71 is connected by the transformer 75 to the rectifier 73. The output from the rectifier 72 is applied across the condenser 76 and load resistor 78 which are connected in parallel; and, the output from the rectifier 73 is connected across the condensers 77 and load resistors 79 which are also connected in parallel, and the D.C. voltages developed in such circuit are in opposition to each other which is effected by connecting the cathode ends of the resistors 78 and 79 together to form a summation circuit. The plate end of the resistor 79 is grounded and the output from the combination is taken by the lead 80 from the plate end of the resistor 78 and is connected to a suitable current operating detecting mechanism 22 which may provide a visual indication or may be a relay or other current operated device. Volt meters 81, 82 are provided, each being connected between the cathode and the end of the secondary opposite the anode connection of each of the tubes 72 and 73 for purposes of determining the rectified output of each circuit and the adjustment of the circuits.

When the test currents flowing in the pick-up coils 19, 20 are identical, the currents in the resistors 78, 79 of the summation circuit will be balanced and no current will flow through the indicating device 22. When there is a difference in the two test currents of the pick-up coils 19, 20, this, of course, will be reflected by the indicating device 22.

One method of operation described in the said Patent No. 2,434,203 contemplates that the part A bridge circuit is unbalanced in one direction and the part B bridge circuit is unbalanced in the other direction. The unbalanced condition in the two parts of the electronic circuit 21 being equal and in opposite directions results in a balance or mutual cancellation of currents in the summation resistors 78, 79 so that the indicator device 22 is not energized. When undesirable defects are encountered in the workpiece, the two parts A, B of the circuit 21 change their degree of unbalance so that one part becomes more nearly balanced while the other part becomes more unbalanced thus providing an overall unbalance which is detected and indicated by the indicator 22. On the other hand, the passage of a harmless variable in the workpiece under test does not change the balanced condition in the circuit 21 because the harmless variable (usually a magnetic change) merely increases or decreases the voltage in the circuit parts A and B by equal amounts maintaining the same condition of balance.

A cathode ray oscillograph, shown diagrammatically at 90, may be used to facilitate adjustment of a balanced condition between the circuits A, B. When connected as shown, proper adjustment of the balancing circuits is indicated by a straight line traced tilted approximately at a 45° angle as is shown in the drawing.

The test mechanism includes a frame 25. A pair of supporting and transporting roller mechanisms 26, 27 are journaled on the frame to transport the work piece 10 through a test station indicated generally at 28. The frame includes an annular test station defining tube 29 which is mounted between end plates 30, 31. The test station defining tube has the saturating coil 15 wound around it. A coil separating tube 32 surrounds the saturating coil 15. The energizing coil 12 is wound around this separating tube 32.

Prior to this invention it has always been assumed that it was essential to maintain a pick-up coil in fixed relationship with the energizing coil. It has been assumed that the energizing coil influenced the pick-up coil and any change in the relative position would change the amount of test current flowing in the pick-up coil. This change, it was believed, would influence the performance of the test mechanism.

It has now been discovered that if the pick-up coil is maintained in constant spaced relationship with respect to that portion of a work piece to be tested, improved and extraordinary results are obtained. The supposition that movement of the pick-up coil would cause distorted results has been disproven at least where, as here, identical test coils are used. With tests conducted in this manner, movement of the two pick-up coils relative to the energizing coil does not affect the accuracy of the test. Any slight varying influence by the energizing coil on a pick-up coil is substantially identical to any influence on the other pick-up coil.

In the preferred and disclosed arrangement this maintenance of the pick-up coil in fixed space relationship with the portion of a piece to be tested is obtained by providing a movable pick-up arm 35. The pick-up arm 35 is pivotally mounted at 36 on a suitable support bracket 37 for pivoting about a horizontal axis. The pivot serves as a guide locating the arm path of travel as it is moved toward and away from a work piece.

The bracket 37 includes a pair of spaced vertical slots 38 which are slidably mounted on suitable mounting screws 39. This slidable mounting permits the pick-up arm 35 and the bracket 37 to be shifted up and down toward and away from the axis of the test station to properly accommodate test work pieces of a wide dimensional range.

During a test operation the work piece 10 is transported through the station 28 by the rollers 26, 27. The illustrated work piece is a tubular pipe having an elongated welded seam 40, which extends from one end of the pipe to the other, FIGURES 3 and 10.

The pick-up arm 35 is gravity biased, in the embodiment shown, against this weld 40. A suitable wearing shoe to serve as a tracking means is provided in the form of an elongated transversely disposed bar 41 which is carried near outer end 42 of the pick-up arm 35. As will be apparent, the purpose of the wearing shoe 41 is to prevent wear on the remainder of the pick-up arm 35. The shoe 41 could, of course, be eliminated and another portion of the arm can serve as the tracking means.

The pick-up coils 19, 20 are wound around a suitable core 43. The core 43 forms the central portion of a pick-up coil mounting plate shown generally at 45. The mounting plate 45 is secured in a suitable recess 46 provided in the outer end portion 42 of the pick-up arm 35. The mounting plate 45 and the outer end 42 of the pick-up arm blend together to provide a suitable work piece following surface 47 which parallels the axis of work piece 10 and which is slightly angled with respect to the remainder of the arm 35.

When a test is to be conducted the bracket 37 and the connected arm 35 are adjusted transversely of the pivot and the axis of the station 28 until the surface 47 is properly spaced from and parallel with the axis of a work piece. The work piece is positioned preferably concentrically in the test station 28 and transported therethrough with the shoe 41 riding along the seam 40, or other portion to be tested. Gravity urges the arm downwardly into its work position with the shoe 41 following along the seam.

With the preferred and described arrangement, as one test piece 10 passes out of the work station 28 gravity will cause the arm to drop to its storage position, FIGURE 9. This storage position is located by the co-action of one of two arm extensions 50 acting against an adjustable stop 51 carried by the bracket 37, FIGURE 9. A succeding work piece passing into the test station from left to right as seen in FIGURE 2 will then urge the test arm back up to its test conducting or work position. When in such work position the pick-up coils 19, 20 are spaced a constant distance from that portion of the work piece being tested. They are in a shielded and guarded position in the pick-up arm but nonetheless in immediate proximity with the work piece. They are within the contour of the energizing and conduction coils, and movable relative to both.

The oustanding result obtained with the test mechanism are emphasized by an examination of FIGURES 6 and 7. FIGURES 6 and 7 are respectively reproductions of actual test results obtained from a mechanism made in accordance with the teachings of the referenced patent and the mechanism of this invention. The tests were conducted on the same work piece. The flaw indicated at 60 in FIGURE 6 is the same flaw as that indicated at 61 in FIGURE 7. Note that the indicia of the flaw in FIGURE 7 is a far greater variance with the remainder of the curve than is the indication at 60 in FIGURE 6. This is even further emphasized by comparative stability of the majority of the test line.

An even more startling indicia of the performance of this mechanism is indicated at 63 in FIGURE 7. The flaw indicated at 63 in FIGURE 7 is not even detectable on the graph of FIGURE 6 and therefore it is a flaw which could not be detected by the prior mechanisms.

While the invention has been described with a great deal of detail it is believed that it essentially comprises a novel and improved flaw detection mechanism which includes a pick-up member movable relative to a work piece to a work position in fixed space relationship with that portion of the work piece to be tested, and a method of using such a mechanism.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a mechanism for detecting flaws in a continuous pipe seam or the like comprising an energizing coil carried by a frame adjacent a test station, means to transport a test piece along a work path and through such station, a pick-up arm support, releasable means connecting the support to the frame and releasable to permit adjustment of the support in an adjustment path toward and away from said workpiece, said support including a pivot having a pivot axis transverse to both such adjustment path and such work path, a pick-up arm mounted on said pivot and extending into said work station, pick-up coil means carried by said arm, and tracking means carried by said arm for contacting a work piece and maintaining said pick-up coil means in predetermined spaced relationship with such work piece.

2. The device of claim 1 wherein the tracking means comprises an elongated bar transversely mounted in the arm.

3. The device of claim 1 wherein the pick-up coil means is carried near the outer end of the arm and wherein the tracking means is near the pick-up coil means and between the pick-up coil means and the pivot.

4. An apparatus for detecting defects in a longitudinally moving elongated workpiece, said apparatus comprising:

(a) a frame defining an inspection station through which a workpiece longitudinally passes along a path for inspection;
(b) a tubularly arranged energizing coil for causing current to circulate circumferentially in the workpiece, said energizing coil being carried by said frame and arranged in spaced relation around the path of the moving workpiece;
(c) sensing means for sensing changes in the characteristics of the current caused when it traverses a defect in the workpiece, said sensing means being carried by said frame and being positioned in the space between the energizing coil and the workpiece;
(d) said sensing means being movable relative to said energizing coil; and,
(e) space maintaining means carried by said sensing means and engaging the moving workpiece to maintain said sensing means in a predetermined spaced relation to the moving workpiece.

5. The apparatus of claim 4 wherein said sensing means is positioned intermediate the ends of the tubular energizing coil.

6. The apparatus of claim 4 including, in combination:
(f) saturating means carried by said frame for magnetically saturating the area of the workpiece under the influence of said energizing coil to render that area of the workpiece substantially non-magnetic.

7. The apparatus for detecting defects in a moving workpiece, said apparatus comprising:
(a) a frame defining an inspection station through which an elongated workpiece longitudinally passes;
(b) a tubular energizing coil carried by said frame for causing a current to circulate perimetrically at least partially around the workpiece as the workpiece passes through the said inspection station, said energizing coil being arranged in spaced relation around the path of the moving workpiece;
(c) sensing means for sensing changes in the characteristics of the current caused when the current traverses a defect, said sensing means being positioned in the space between the workpiece and the tubular energizing coil and intermediate the ends of the energizing coil;
(d) biased means movably connecting said sensing means to said frame so as to be movable relative to said energizing coil;
(e) said sensing means including a shoe for slidably engaging the moving workpiece and for maintaining said sensing means in a constant predetermined spaced relation to the workpiece; and,
(f) said biased means urging said shoe against the surface of the workpiece to assure maintenance of said predetermined spacing.

8. The apparatus of claim 7 including guide means carried by said frame for maintaining a longitudinally moving workpiece in predetermined constant spaced relation.

9. The apparatus of claim 7 wherein said sensing means comprises a plurality of pick-up coils co-axially arranged and disposed parallel to the longitudinal axis of the workpiece path so that a point on a moving workpiece passes first one coil and then another, and a balanced bridge circuit having a first of said pick-up coils in one of its branches and a last of said pick-up coils in another of its branches.

10. The method of detecting defects in a welded seam of a longitudinally moving pipe, said method comprising:
(a) causing an eddy current to circulate in the pipe in at least the area of the seam with an energizing means capable of inducing such eddy current;
(b) traversing the pipe with a sensing means to sense changes in the characteristics of the current caused by defects in the welded seam;
(c) maintaining the sensing means in sliding contact with the seam as the pipe moves past the sensing means to assure a constant spacing between said pipe; and, (d) permitting lateral movement of the sensing means relative to the energizing means while maintaining said sensing means in said sliding contact with the workpece to accommodate variations in the inspected area of the workpiece as the workpiece and its said sensing means move relatively.

11. An apparatus for detecting defects in a longitudinally moving workpiece, said apparatus comprising:

(a) a frame defining an inspection station means to transport a workpiece longitudinally along a path of travel through the station for inspection;

(b) energizing coil means carried by said frame and disposed adjacent the path of travel, said energizing coil means being spaced from the path of travel for inducing an eddy current to circulate in a workpiece in at least an area of a workpiece to be inspected for defects;

(c) sensing means carried by said frame for sensing a change in the characteristics of the eddy current caused when the eddy current traverses a defect in a workpiece;

(d) said sensing means being movable relative to said energizing coil means and laterally relative to the path of workpiece travel to follow lateral variations of an inspected workpiece as a workpiece passes through the inspection station; and, (e) space maintaining means carried by said sensing means for constantly maintaining said sensing means in a close, substantially constant predetermined spaced relationship to a workpiece as a workpiece passes through the inspection station so that the sensing means moves relative to said energizing means and remains in a close spaced relation to a workpiece.

12. The apparatus of claim 11 wherein said space maintaining means rides on a moving workpiece to maintain said sensing means in said close, predetermined spaced relation to a workpiece.

13. An apparatus for detecting defects in a longitudinally moving workpiece, said apparatus comprising:

(a) a frame defining an inspection station through which a longitudinally moving workpiece passes along a path of travel for inspection;

(b) an energizing coil carried by said frame and positioned in spaced relation to the path of travel, said energizing coil at least partially surrounding at least an area of a workpiece to be inspected for defects and inducing an eddy current to circulate in at least such area;

(c) sensing means carried by said frame and including a pick-up coil for sensing a change in a characteristic of the current caused when the current traverses a defect in a workpiece, said pick-up coil being positioned in the space between said energizing coil and the path of travel, and said pick-up coil being movable laterally relative to said energizing coil to accommodate lateral variations of a workpiece as a workpiece passes through the inspection station; and, (d) space maintaining means carried by said sensing means for maintaining said pick-up coil in close, predetermined spaced relationship to a moving workpiece.

14. A flaw detection mechanism comprising:

(a) a frame defining an inspection station through which a workpiece passes along a path of travel for inspection;

(b) an energizing coil carried by the frame and disposed adjacent to the path of travel, said energizing coil being spaced from the path of travel for inducing an eddy current to flow in a workpiece in at least the portion of the workpiece to be inspected;

(c) a pick-up coil carried by said frame for sensing a change in the characteristics of the eddy current caused when the eddy current confronts a defect in a workpiece, said pick-up coil being disposed in the space between the energizing coil and the path of travel;

(d) said pick-up coil being movable laterally in the space between the energizing coil and the path of travel; and, (e) space maintaining means interposed between the coil and the path of travel and engageable with a workpiece to maintain the pick-up coil in close, substantially constant predetermined spaced relation to a workpiece as the workpiece moves in the inspection station.

15. The mechanism of claim 14 wherein the energizing coil is disposed around said pick-up coil and around the path of workpiece travel so that the axis of said energizing coil is substantially in longitudinal alignment with the path of workpiece travel.

16. A flaw detection mechanism comprising:

(a) a frame;

(b) a tube connected to the frame and defining a test station;

(c) an energizing coil surrounding the tube for inducing a current to circulate in a workpiece passing through the tube and through such station;

(d) means on the frame to transport a workpiece through the station;

(e) a pick-up member carried by said frame and positioned substantially within the tube and within the energizing coil;

(f) a pick-up coil carried by said pick-up member and movable laterally within said tube relative to said energizing coil; and, (g) said pick-up member including space maintaining means engageable with a workpiece passing through the station to maintain the pick-up coil in a close, substantially constant predetermined spaced relationship with the portion of a workpiece to be tested.

17. The mechanism of claim 16 including, in combination:

(h) means pivotally connecting said pick-up member to the frame so that the pick-up member is pivotal between a storage position and a working position, the pick-up member being in its working position when the space maintaining means is in engagement with a workpiece to maintain the pick-up coil in its close, substantially constant spaced relationship with the workpiece, the pick-up member when in the storage position being disposed in part within the path of a workpiece and being movable to the work position by a workpiece as it enters the work station.

18. The method of detecting defects in a workpiece, the method comprising:

(a) causing an eddy current to circulate in the workpiece in at least the area to be inspected for defects with an energizing means capable of inducing such eddy current;

(b) traversing the workpiece with a sensing means to sense changes in the characteristics of the eddy current caused by defects in the workpiece;

(c) maintaining the sensing means in a close, substantially constant predetermined spaced relation to the workpiece as the workpiece and sensing means move relatively; and, (d) permitting lateral movement of the sensing means relative to the energizing means while maintaining said sensing means in said close, substantially constant predetermined spaced relation to the workpiece to accommodate variations in the inspected area of the workpiece as the workpiece and said sensing means move relatively.

19. The method of detecting the presence of flaws in a workpiece comprising the steps of:
(a) inducing an eddy current in a workpiece with an energizing means capable of inducing the eddy current;
(b) simultaneously moving the workpiece relative to a movable pick-up arm carrying current pick-ups of identical current detecting capabilities;
(c) maintaining the pick-ups in close, constant spaced relationship with the workpiece to be inspected by maintaining the arm in constant contact with the workpiece being tested while the workpiece is moving;
(d) permitting the arm and the pick-ups to move relative to the energizing means according to variations in the workpiece; and,
(e) comparing the currents detected in the workpiece by the pick-ups.

References Cited by the Examiner
UNITED STATES PATENTS

| | | | |
|---|---|---|---|
| 2,111,210 | 3/1938 | Ebel | 324—40 |
| 2,124,579 | 7/1938 | Knerr | 324—40 |
| 2,220,563 | 11/1940 | White | 324—40 |
| 2,467,306 | 4/1947 | Habig | 324—40 |
| 2,882,488 | 4/1959 | Price et al. | 324—37 |
| 2,892,150 | 6/1959 | Nettles | 324—37 |
| 2,998,566 | 8/1961 | Cochran | 324—37 |

WALTER L. CARLSON, *Primary Examiner.*

SAMUEL BERNSTEIN, JAMES W. LAWRENCE, *Examiners.*